United States Patent [19]
Jacob et al.

[11] Patent Number: 5,071,214
[45] Date of Patent: Dec. 10, 1991

[54] INTERFEROMETRIC FIBRE OPTIC NETWORK

[75] Inventors: Peter G. Jacob, Gilmore; Martin C. Elias, O'Connor; Robert A. Griffin, Queanbeyan; Scott C. Rashleigh, Waniassa, all of Australia

[73] Assignee: The Commonwealth of Australia, Canberra, Australia

[21] Appl. No.: 601,744

[22] PCT Filed: May 11, 1989

[86] PCT No.: PCT/AU89/00201
§ 371 Date: Jan. 10, 1991
§ 102(e) Date: Jan. 10, 1991

[87] PCT Pub. No.: WO89/11110
PCT Pub. Date: Nov. 16, 1989

[30] Foreign Application Priority Data
May 12, 1988 [AU] Australia .................................. PI8189

[51] Int. Cl.$^5$ .......................... G02B 6/28; G01B 9/02; H01J 5/16
[52] U.S. Cl. ...................................... 385/12; 356/345; 250/227.19; 385/48; 385/24
[58] Field of Search ............... 350/96.11, 96.12, 96.13, 350/96.14, 96.15, 96.16, 96.29, 96.30; 356/345, 350; 250/227.16, 227.17, 227.19; 370/1, 3; 455/606, 612

[56] References Cited
U.S. PATENT DOCUMENTS

| | | | |
|---|---|---|---|
| 4,440,498 | 4/1984 | Sheem | 356/350 |
| 4,445,780 | 5/1984 | Burns | 356/350 |
| 4,632,551 | 12/1986 | Pavlath | 250/227.19 X |
| 4,653,917 | 3/1987 | Moeller et al. | 356/350 |
| 4,662,751 | 5/1987 | Goss et al. | 356/350 |
| 4,772,084 | 9/1988 | Bogert | 350/96.15 |
| 4,778,239 | 10/1988 | Shaw et al. | 350/96.16 |
| 4,784,453 | 11/1988 | Shaw et al. | 350/96.16 |
| 4,944,590 | 7/1990 | Poisel et al. | 356/350 |
| 4,989,979 | 2/1991 | Buckman | 356/345 |

Primary Examiner—Brian Healy
Attorney, Agent, or Firm—Sterne, Kessler, Goldstein & Fox

[57] ABSTRACT

An interferometric fibre optic network includes a downlead optical fibre (12) and a pair of uplead optical fibres (14, 16). Sites for a plurality of interferometric sensor pairs (25) are arranged whereby each pair (25) is optically connected in use of the network to the downlead and uplead fibers (12, 14, 16) via a 3×3 fibre optic coupler (30) and respective further fibre optic couplers (32) on the uplead fibres (14, 16). The uplead fibres (14, 16) are multimode optical fibres, and each of the 3×3 couplers (30) is optically connected to the respective further couplers (32) by a single mode optical fibre (34). The further couplers (32) are asymmetric couplers having high tap-on coupling from the single mode optical fibre (34) to the respective uplead fibre (14, 16) but low tap-off coupling from the uplead fibre (14, 16).

9 Claims, 1 Drawing Sheet

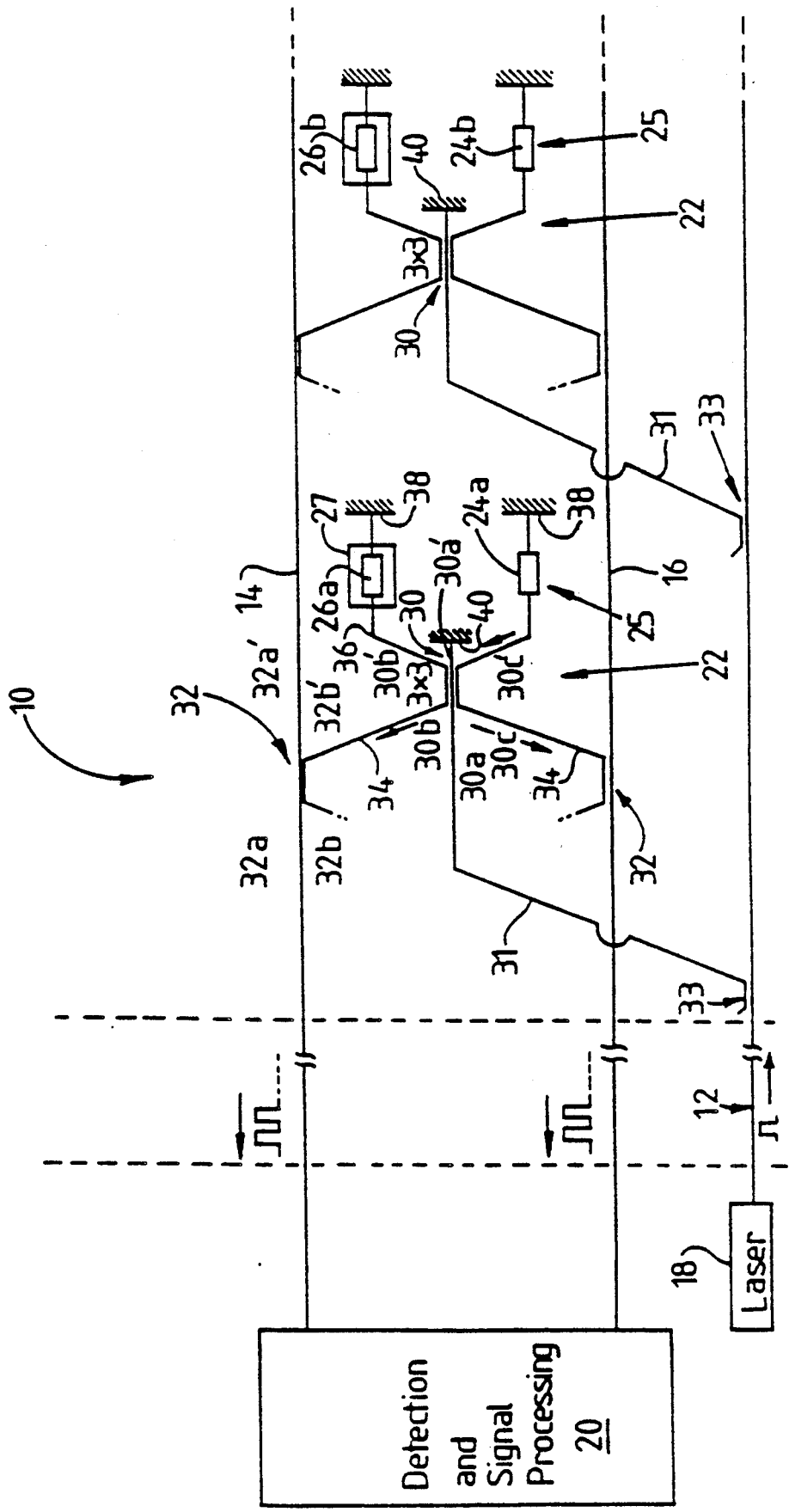

INTERFEROMETRIC FIBRE OPTIC NETWORK

FIELD OF THE INVENTION

This invention is concerned with the addressing and monitoring of interferometric fibre optic sensors and more particularly provides a fibre optic network which may be utilised with sensors to form an addressable fibre optic array of interferometric sensors.

BACKGROUND ART

Interferometric fibre optic sensors rely on the existence of optical signals travelling along two or more paths which combine at a certain point. The variation in phase delay between the optical signals results in cyclic fluctuation in the optical intensity at the optical path junction as measured by an optical detector such as a photo diode.

The magnitude of the fluctuation of intensity due to the interference in relation to the intensities of the separate optical signals is determined by their coherence and the accuracy with which their polarization axes are aligned at the path junction.

Coherence is assured by arranging that the optical signals in the separate paths originate from a common source, typically a laser, whose output signal coherence length, or the propagation distance over which optical phase is maintained, exceeds the difference between the separate optical path lengths. Polarization control is usually achieved by the use of polarization-maintaining or birefringent fibre with well defined optical axes and careful alignment of these axes for the separate optical paths.

Interferometers can take numerous forms. In a Fabry-Perot interferometer the separate optical paths consist of different numbers of passes over the same physical path between partially reflecting mirrors. The Michelson configuration splits the light from the source into two physical paths terminating in mirrors. The signals are reflected and recombine at the original splitting point. In the Mach-Zehnder case the two separate paths recombine at a second junction.

In a fibre interferometer all of the optical paths are within optical fibre. The splitting and recombining points consist of optical fibre directional couplers.

An example of a sensing application is a sound transducer such as a hydrophone which comprises at least one coil of continuous optical fibre called the sensing coil with associated partially reflecting joints, couplers and possibly a second reference coil, where the exact configuration depends on the interferometer type in use. The precise optical path length along the sensing coil is sensitive to sound waves in water in which the transducer is placed. Where present, the second reference coil is insulated from the sound field and typically provides compensation for the effects of temperature changes, static pressure, acceleration, etc by reducing the effect of these influences on the optical path length difference. This difference is typically less than 1% of the actual path lengths in the two coils.

In the simple case of a fibre Mach-Zehnder interferometer where the incident light is fed through a fused biconical taper 2×2 fibre optic coupler and the output signals are combined at a second 2×2 coupler, there is a net 180° phase shift between the outputs of the combining coupler. The interference fringes include a cyclic null condition at which sensitivity is diminished. This is commonly referred to as signal fading. To avoid this condition, it has been proposed (Sheem, J. Appl. Phys. 52(6), June 1981, 3865) to combine the sensor output signals through a biconical taper 3×3 coupler, thereby producing three signals which are not in antiphase. Alternative signal processing techniques have utilised two or all three of these signals from the output ports of the 3×3 coupler.

For many sensing applications, and in particular for hydrophone applications, a practical requirement is that the sensors can be arranged in a multiplexed linear array, using a small number of downlead and uplead fibres. The fundamental limitation on all fibre optic multiplexing schemes involving passive power splitting is the amount of optical power available from the source and the efficiency with which this can be shared between all sensors and returned to the detector.

Many multiplexing schemes have been proposed, involving all manner of time-division, frequency division, and other techniques to separate the signals from the individual sensors. However, all schemes, which to date have generally involved single mode fibre only, have the same overall loss constraints. These are imposed by the symmetric splitting loss characteristics of the couplers which dictate that splitting loss must be the same in both directions. It is an object of the invention to overcome these present limitations on the wider application of interferometric sensors in multiplexed fibre optic networks.

DISCLOSURE OF THE INVENTION

The invention therefore provides an interferometric fibre optic network which includes a downlead optical fibre and a pair of uplead optical fibres. Sites for a plurality of interferometric sensor pairs are arranged whereby each site is optically connected to the downlead and uplead fibres via a plurality of fibre optic couplers which include a 3×3 fibre optic coupler and respective further fibre optic couplers on the uplead fibres. The uplead fibres are multimode optical fibres and each of the 3×3 couplers is optically connected to the respective further couplers by a single mode optical fibre. The further couplers are asymmetric couplers having high tap-on coupling from the single mode optical fibre to the respective uplead multimode fibre but low tap-off coupling from the uplead fibre.

The network may include interferometric sensor pairs at the respective sites. Each optical sensor pair is preferably in a Michelson configuration including a pair of reflectors terminating respective branches of said 3×3 coupler, one of which branches is subjected in use of network to an influence to be sensed. In use of the network, one sensor is typically a test sensor sensitive to an influence of interest, while the other sensor is a reference sensor shielded from the influence.

Each optical sensor pair is advantageously optically connected to the downlead fibre via the 3×3 coupler and a branch from the downlead fibre: in this case, the through fibre from that branch at the 3×3 coupler may terminate at a reference reflector.

Advantageously, each 3×3 optical fibre coupler, which may comprise a biconical taper 3×3 coupler, is configured so that a first port of a first group of three ports of the coupler is optically connected to the downlead fibre while the other two ports of this group are optically connected to the respective uplead fibres, and so that two ports of a second group of three ports of the coupler are optically connected to the respective sensors of the associated sensor pair.

Each 3×3 optical fibre coupler may be further configured so that:

(i) power tap-off coupling to the two ports of the second group from said first port of the first group is substantially or nearly equal;

(ii) the power coupling from these two ports of the second group to said other two ports of the first group is also substantially or nearly equal, and is preferably greater than tap-on power coupling to said first port of the first group; and (iii) the signals on each of said other two ports of the first group derived from said sensors are in a phase relationship to prevent signal fading and to optimise interference fringe sensitivity to changes in one or other sensor arising from an influence on that sensor. The optimum phase difference is 90°, i.e. perfect quadrature.

BRIEF DESCRIPTION OF THE DRAWING

The invention will be further described, by way of example only, with reference to the accompanying drawing, which is a diagrammatic representation of an addressable hydrophone array incorporating plural interferometric fibre optic sensor pairs in a fibre optic network according to the invention, shown coupled to detection and signal processing circuitry.

BEST MODE(S) FOR CARRYING OUT THE INVENTION

The depicted array 10 includes three continuous light paths defined by three distinct optical fibres: a single mode transmit or downlead fibre 12 and two multimode return or uplead fibres 14, 16. A coherent light source such as a laser 18 directs light pulses out along fibre 12. The signals returned back along uplead fibres 14, 16, which, as will be seen, each comprise a train of time-spaced optical pulses following each transmitted laser pulse, are received and analysed by detection/processing circuitry 20.

A sequence of pairs 25 of hydrophones 24, 26 are arranged at intervals along fibres 12, 14, 16. Each pair is part of an arrangement 22 which bridges the three fibres and incorporates a fused biconical taper 3×3 coupler 30, respective asymmetric fused biconical taper 2×2 couplers 32 on uplead fibres 14, 16, and a further fused biconical taper 2×2 coupler 33 on downlead fibre 12. Couplers 30 are disposed so that the respective branch 31 from downlead fibre 12 at coupler 33 is directly optically connected to and continuous through the coupler 30, from the a to the a' port in each case, and terminates downstream at a reference reflector 40. The other "upstream" ports 30b, 30c of couplers 30 (i.e. the ports on the same end as the input port 30a of downlead branch 31) are optically connected via single mode fibre segments 34 with the "downstream" branch ports 32b' of the respective couplers 32.

Hydrophones 24, 26 are of conventional construction and comprise respective optical fibres 36 coiled on a core. Each fibre 36 is connected at one end to a respective "downstream" port 30b', 30c' of coupler 30 and at the other end terminates at a reflector 38. One hydrophone 24, is a test sensor in which the precise optical path length along the fibre is sensitive to sound waves in a water medium in which it is placed. The other hydrophone 26 is a reference sensor and is therefore shielded 27 from these waves, for example by being inside the coil of hydrophone 24. By suitable design, the waves produce an optical path change between the two arms and the resultant interference can be monitored as an intensity modulation on the coupler ports 30a, 30b and 30c.

For an input optical power $P_o$ in fibre 30a, the intensity of these outputs is given by:

$$P_{a'} = C_{aa'}P_o \tag{1a}$$

$$P_a = 2C_{ab'}^2 P_o (1 + \cos\delta) \tag{1b}$$

$$P_{b,c} = C_{ab'}P_o[C_{b'b} + C_{c,b} - 2\sqrt{(C_{b'b}C_{c'b})}\cos(\theta \pm \delta)] \tag{1c}$$

where $P_o$—Incident power in fibre 30a $P_{a'}$—Through power of fibre 30a to 30a'

$C_{ij'}$—Coupling coefficients between fibres i and j'
i=a,b,c; j'=a',b',c'

Note that $C_{ij'} = C_{j'i}$ for a symmetric coupler $\delta$—Differential optical phase between the sensing and reference fibre lengths produced by the measured, in this instance sound waves in the water.

$\theta$—Phase difference between the through coupling and the cross coupling of the interferometer arms. $\theta = \phi_{bb'} - \phi_{bc'}$. This parameter remains constant for a given coupler and is set during coupler manufacture.

From equations (1), when $\theta = -135°$ then $P_b$ and $P_c$ are of equal amplitude and in phase quadrature. These outputs can be used to retrieve the interferometer phase information without signal fading by using, for example, differential cross multiplying processing.

The quadrature condition for outputs b and c occurs when the 3×3 coupling coefficients are $$\begin{aligned} & & C_{ab'} = C_{ac'} = 0.4 \\ C_{aa'} & = & C_{bb'} = C_{cc'} = 0.2 \\ & & C_{b'c} = C_{c'b} = 0.4 \end{aligned}$$

In practice lossless and symmetric couplers are difficult to produce. A real 3×3 coupler is likely to differ from the desired 40:20:40 coupling ratios and therefore alter the 90° phase relationship between $P_b$ and $P_c$. However, quadrature can be reestablished between the photocurrents $(i_b + i_c)$ and $(i_b - i_c)$, although their relative amplitudes will become increasingly dissimilar as the phase difference deviates from 90°.

In use, laser 18 is activated to transmit incident pulses of coherent light along downlead fibre 12. Couplers 33 are non-equal power splitters to the extent that the tap-off coupling to branches 31 is much less than 50%, thus optimising the number of hydrophone pairs able to be serviced with sufficient signal by a single downlead fibre. At each coupler 30, 80% of the incident light on branch 31 at port 30a is split into the two arms of the interferometer. The remaining power is immediately reflected back through the 3×3 coupler by reference reflector 40 and coupled to upleads 14, 16 via fibre segments 34 and couplers 32. After a time interval, dictated by the delay time of light through the test and reference hydrophones 24, 26, the light in the interferometer arms returns to the 3×3 coupler 30 and is similarly coupled onto the uplead fibres 14, 16.

As a result of a single pulse along the downlead, two sets of pulses from each hydrophone pair are received from both uplead fibres. The first simultaneous pulse pair from the reflection at reflector 40 provides a reference signal containing information on the system excess loss and coupling ratios. The second pulse pair provides the additional phase information produced by the measurand from the first hydrophone pair. This is repeated with each hydrophone pair, being identified on a time of arrival basis.

As already noted, uplead fibres 14, 16 are multimode fibres. Return fibre segments 34 to the uplead fibres are however single mode fibre, and couplers 32 are asymmetric multimode/single mode couplers e.g. to achieve 95% tap-on coupling from branch port 32b' to port 32a. This configuration allows significantly lower system losses (and hence a correspondingly greater number of sensors for a given loss budget) to be achieved than is possible for any practical, multiplexed system using single mode fibre only. The lower losses result because the coupling efficiency from the single mode to the multimode fibre is high while the coupling efficiency and hence power loss to the unused single mode port 32b is low.

Thus, at each asymmetric (single mode to multimode) coupler 32, the power from the associated hydrophones which arrives on single mode fibre segment 34 is added to the multimode uplead fibre 14, 16 with very little loss of the optical signal already on the uplead fibre from hydrophones further away.

This asymmetric mode of operation is not possible when the coupler is made exclusively from single mode fibre. In that case a high coupling coefficient on to the (single mode) uplead would result in an equally large proportion of all the power in the uplead being coupled to the unused port and hence being lost.

The laser pulses are preferably spaced in time so that all reflections are returned before the next outward pulse: this avoids the undesirable presence of reflections in the laser as it transmits. This enhances laser frequency noise and can be detrimental to the signal to noise ratio of a system. Alternatively, interferometer phase noise caused by laser frequency noise can be alleviated by reducing the optical path difference and including optical isolation to the laser diode.

For interference to be observed, the laser source should have a coherence length larger than the optical path difference. In addition, to remove modal noise, the downlead fibre 12, couplers 33 and interferometer should be constructed of single mode fibre. These components should also preserve polarization to maintain a constant level of high visibility.

In order to separate the return reference and sensing signals from a given interferometer, the laser pulse length needs to be less than 2 Ln/c, where L is the fibre length incorporated in the interferometer arms, n is the fibre core refractive index and c the velocity of light in free space. This sets a minimum fibre interaction length for the interferometer. As an example, acoustic sensing can require interaction lengths of hundreds of meters, giving a maximum pulse length of $\sim 1$ $\mu$sec per hundred meter interaction length.

If the physical distance between hydrophones is small and insufficient to satisfactorily separate the pulse groups from individual hydrophones, then a suitable delay may be introduced into the downlead fibre.

As already mentioned, the ideal phase difference between the pulses at ports 30b, 30c is 90°—i.e. precise quadrature—so that optimum interference fringes are observed at the two ports for maximum sensitivity to changes in the precise light path length at test hydrophone 24. However, the design of couplers 30 will be a compromise between the conflicting requirements for optimum 45° phase differences across ports 30b, 30c and 30b', 30c' (to give a net 90°), and minimal power coupling of the reflected signals back to downlead fibre 12.

The reference reflector 40 plays a useful role in the operation of the network. When coherent light from the interferometer is coupled into the multimode uplead fibres 14, 16, it initially couples into several propagation modes. Further coupling into other propagation modes will occur along the uplead fibres as a result of small perturbations in fibre characteristics, bends, etc.

All of the modes have slightly different propagation constants with the result that they produce their own interference pattern along the fibre; if the fibre were cut and looked at end-on one would see a speckle pattern of light and dark areas because of interference.

In general, the losses along the uplead fibre through the couplers, splices, etc. are different for different modes. Because the coupling between modes varies rapidly with time and because of the mode selective losses, the intensity as measured by a detector at the end of the uplead fibre will undergo large and unpredictable fluctuations, commonly referred to as modal noise.

High optical power does not help as the noise is a certain fraction of the optical power and will increase correspondingly.

Reference reflector 40 couples to the uplead fibres 14, 16 a signal which is indistinguishable from a hydrophone signal except that it precedes the hydrophone signal by the round-trip propagation time through the coils (typically 1-2 $\mu$s). The optical signal is of course suitably pulsed so that the reflection from the reference reflector 40 stops before the optical signals from the hydrophones re-emerge.

In the short time between reference and hydrophone signals, the variation in loss due to the abovementioned modal effects will in most practical cases be negligible. The amplitude of the received reference signal can therefore be used for pulse-by-pulse correction of the hydrophone signals.

The power coupling from ports 30b' and 30c' to fibres 14, 16 is preferably substantially equal, but if this desideratum cannot be met, circuitry 20 can make suitable allowance through gain adjustment or the like.

In a practical application, fibres 12, 14, 16 may be enclosed in a long cable along which hydrophone pairs 24, 26 are disposed at regular intervals—hydrophones 24 exposed to the surrounding medium and hydrophones 26 shielded therefrom. If several such arrays are trailed behind a boat or submarine, the direction and other characteristics of observed sounds can be determined.

It will be understood that the invention is applicable to any paired sensors which rely on an interferometric effect to respond to changes in an ambient condition. Such sensors may include inter alia, accelerometers, magnetometers and temperature sensors.

The arrangement and the array of the invention have a very large dynamic range and are very sensitive to minute ambient changes.

We claim:

1. An interferometric fibre optic network comprising:
   a downlead optical fibre and a pair of uplead optical fibres; and
   sites for a plurality of interferometric sensor pairs arranged whereby each site is optically connected to said downlead and uplead fibres via a plurality of fibre optic couplers which include a 3×3 fibre optic coupler and respective further fibre optic couplers on said uplead fibres;

wherein said uplead fibres are multimode optical fibres, each of said 3×3 couplers is optically connected to the respective said further couplers by a single mode optical fibre and said further couplers are asymmetric couplers having high tap-on coupling from said single mode optical fibre to the respective said uplead fibre but low-tap off coupling from said uplead fibre.

2. An interferometric fibre optic network according to claim 1 wherein said sites are occupied by respective interferometric optical sensor pairs.

3. An interferometric fibre optic network according to claim 2 wherein each of said optical sensor pairs is in a Michelson configuration including a pair of reflectors terminating respective branches of said 3×3 coupler, one of which branches is subjected in use of network to an influence to be sensed.

4. An interferometric fibre optic network according to claim 1, wherein each of said optical sensor pairs is optically connected to said downlead fibre via the 3×3 coupler and a branch from said downlead fibre.

5. An interferometric fibre optic network according to claim 4 wherein the through fibre from said branch at said 3×3 coupler terminates at a reference reflector.

6. An interferometric fibre optic network according to claim 1 wherein each of said 3×3 optical fibre couplers is a biconical taper 3×3 coupler.

7. An interferometric fibre optic network according to claim 1 wherein each of said 3×3 optical fibre couplers is configured so that a first port of a first group of three ports of the coupler is optically connected to said downlead fibre while the other two ports of said first group are optically connected to the respective said uplead fibres, and so that two ports of a second group of three ports of the coupler are optically connected to the respective sensors of the associated sensor pair.

8. An interferometric fibre optic network according to claim 7 wherein each of said 3×3 optical fibre couplers is further configured so that:

(i) power tap-off coupling to said two ports of the second group from said first port of the first group is substantially or nearly equal;

(ii) the power coupling from these two ports of the second group to said other two ports of the first group is also substantially or nearly equal, and is preferably greater than tap-on power coupling to said first port of the first group; and (iii) the signals on each of said other two ports of the first group derived from said sensors are in a phase relationship to prevent signal fading and optimise interference fringe sensitivity to changes in one or other sensor arising from an influence on that sensor.

9. An interferometric fibre optic network according to claim 1 wherein said sites are occupied by respective optical hydrophones.

* * * * *